(12) United States Patent
Haymond

(10) Patent No.: US 7,681,100 B2
(45) Date of Patent: Mar. 16, 2010

(54) SYSTEM AND METHOD FOR RETRANSMISSION OF VOICE PACKETS IN WIRELESS COMMUNICATIONS

(75) Inventor: William Dean Haymond, Surrey (CA)

(73) Assignee: Pine Valley Investments, Inc., Las Vegas, NV (US)

( * ) Notice: Subject to any disclaimer, the term of this patent is extended or adjusted under 35 U.S.C. 154(b) by 972 days.

(21) Appl. No.: 10/920,553

(22) Filed: Aug. 18, 2004

(65) Prior Publication Data

US 2006/0041815 A1 Feb. 23, 2006

(51) Int. Cl.
*G08C 25/02* (2006.01)
*H04L 1/18* (2006.01)

(52) U.S. Cl. .................. 714/748; 455/423; 714/749
(58) Field of Classification Search .......... 714/748, 714/749; 455/423
See application file for complete search history.

(56) References Cited

U.S. PATENT DOCUMENTS

| | | | |
|---|---|---|---|
| 6,189,122 B1* | 2/2001 | Cheng | 714/748 |
| 6,278,716 B1* | 8/2001 | Rubenstein et al. | 370/432 |
| 6,373,842 B1* | 4/2002 | Coverdale et al. | 370/394 |
| 6,574,668 B1* | 6/2003 | Gubbi et al. | 709/237 |
| 6,738,370 B2* | 5/2004 | Ostman | 370/349 |
| 7,006,798 B2* | 2/2006 | Miyoshi et al. | 455/67.11 |
| 7,088,701 B1* | 8/2006 | Attar et al. | 370/347 |
| 7,095,729 B2* | 8/2006 | Sachs et al. | 370/341 |
| 7,505,764 B2* | 3/2009 | Proctor et al. | 455/423 |
| 2003/0032439 A1* | 2/2003 | Harris et al. | 455/517 |
| 2004/0042492 A1* | 3/2004 | Suzuki et al. | 370/473 |
| 2005/0276249 A1* | 12/2005 | Damnjanovic et al. | 370/335 |
| 2006/0013257 A1* | 1/2006 | Vayanos | 370/473 |

FOREIGN PATENT DOCUMENTS

| | | |
|---|---|---|
| GB | 2 371 438 | 7/2002 |
| GB | 2 386 517 | 9/2003 |
| WO | WO 00/10298 | 2/2000 |

OTHER PUBLICATIONS

Akabane K et al: "Error control scheme for TCP packet radio systems" Vehicular Technology Conference 1999. VTC 1999—Fall. IEEE VTS $50^{th}$ Amsterdam. Netherlands Sep. 19-22, 1999, Piscataway, NJ USA, IEEE, US, vol. 1, Sep. 19, 1999, pp. 339-342, XP010352960 ISBN: 0-7803-5435-4.

\* cited by examiner

*Primary Examiner*—Sam Rizk
(74) *Attorney, Agent, or Firm*—Allen, Dyer, Doppelt, Milbrath & Gilchrist, P.A.

(57) ABSTRACT

A system and method for retransmission of voice packets in wireless communications are provided. The method includes transmitting a voice packet from a base station to a communication unit or from a communication unit to a base station at a rate faster than a generation rate of the voice packet. The method further includes determining whether the transmitted voice packet is successfully received and retransmitting the voice packet if not successfully received. The number of retransmissions is limited by a predetermined value.

17 Claims, 7 Drawing Sheets

SYSTEM AND METHOD FOR RETRANSMISSION OF VOICE PACKETS IN WIRELESS COMMUNICATIONS

BACKGROUND OF THE INVENTION

This invention relates generally to wireless communication systems and more particularly, to wireless voice communication systems.

In wireless communication systems, a portable or mobile communication unit (e.g., portable or mobile radio or telephone) may be configured to allow a member of a group of related units to transmit a voice message to a base station, with the base station then broadcasting the message to the other members of the group. For example, when one person talks on their unit, the other group members receive the communication and can listen on their units. Alternatively, a portable or mobile unit may communicate with only one other unit.

A mobile communication unit (e.g., mobile telephone), in contrast to a portable communication unit, typically receives power from the battery of a vehicle. A portable communication unit typically receives power from the battery of the portable unit. In operation, when a communication unit operates in half-duplex mode, the unit transmits or receives voice, but does not transmit and receive voice simultaneously. Thus, in half-duplex mode, a user desiring to talk, pushes, for example, a push-to-talk button on the unit allowing the user to talk, while one or more users receive the communication and those users are only able to listen to the communication. Alternatively, when operating in a full duplex mode, voice is transmitted and received by the unit simultaneously. When operating in full duplex mode, for example, the unit communicates with another unit operating in full duplex mode allowing simultaneous transmission and reception of voice.

The quality of wirelessly transmitted voice may be affected by multi-path fading, which produces errors in the digital transmission of digitized compressed voice packets (also known as voice blocks). The multi-path fading duration may be relatively short (<5 milliseconds (msec)) for a transmission from a mobile phone unit traveling at relatively fast speeds (e.g., 60 miles per hour (mph)) as compared to the multi-path fading duration for a transmission from a portable phone unit moving at relatively slow speeds (e.g., 5 mph). Thus, depending on whether the user of the communication unit is, for example, travelling in a car or walking, the duration of possible multi-path fading is affected. It is known to use error detection and correction codes, such as, for example, a Reed Solomon code, to detect and correct errors within a voice packet. However, these error detection and correction codes are not always effective in correcting errors in voice packets having long duration multi-path fades. Further, the effectiveness of the error detection and correction is also affected by the type of communication unit. For example, a portable phone unit usually transmits with much less power than a mobile phone unit because a portable phone unit typically uses its own internal battery power, thus, increasing the problem with multi-path fading.

It is also known in packet technology to use retransmission of packets to improve transmission quality when packet errors are detected. In this scheme, and when error detection and correction codes are unable to correct for errors in transmission, a request is made to the transmitter to retransmit, for example, the packet that failed to be transmitted and received in a useable form. A form that is not useable may be a packet received with errors that can not be corrected by an error detection and correction scheme. Herein, a packet received in a useable form is equivalent to a packet received in a correctable form. However, with respect to voice packets, voice latency for retransmission of voice packets causes delays, thereby causing a noticeable delay to a user receiving the voice packets (e.g., delay in received voice). For example, when real-time voice is transmitted (as compared to transmitting streaming voice from a storage medium), the transmission needs to be received by the human user typically within a quarter of a second from generation at the source in order for voice delay to be unnoticeable. Retransmission of voice packets for packets that failed to be transmitted and received in a useable form may cause voice delay in the conversation to be greater than a quarter of a second, which becomes noticeable and annoying to the human users. In real-time packetized voice communications, the received voice transmission is not provided as a continuous stream, and increased voice latency (e.g., due to packet delays), may reduce user satisfaction and may be unacceptable to certain users (e.g., time sensitive conversations).

BRIEF DESCRIPTION OF THE INVENTION

According to an exemplary embodiment, a method for controlling wireless communications is provided. The method includes transmitting a voice packet from a base station to a communication unit at a rate faster than a generation rate of the voice packet. The generation rate of the voice packet may be approximated to the amount of voice encapsulated per packet. For example, 90 msec of voice may be formed into a packet at a rate of approximately 90 msec per packet. The method further includes determining whether the transmitted voice packet is successfully received and retransmitting the voice packet if not successfully received. The number of retransmissions is limited by a predetermined value.

According to another exemplary embodiment, a method for controlling wireless communications is provided. The method includes transmitting from a first communication unit to a base station an inbound voice packet at a rate greater than a generation rate of the inbound voice packet. The method further includes receiving by the first communication unit from the base station a decode status in response to receiving the inbound voice packet at the base station from a last transmission, the decode status indicating whether the inbound voice packet of the last transmission was received by the base station in a correctable form. The first communication unit retransmits to the base station the inbound voice packet when the decode status indicates to the first communication unit that the inbound voice packet of the last transmission by the first communication unit was received by the base station in an uncorrectable form. The first communication unit limits a number of the retransmissions from the first communication unit to the base station to a predetermined value.

According to yet another exemplary embodiment, a wireless communications system is provided that includes a base station and a plurality of communication units for communicating with the base station. A first communication unit of the plurality of communication units is configured to transmit to the base station an inbound voice packet at a rate greater than a generation rate of the inbound voice packet. The base station is configured to send a decode status to the first communication unit in response to receiving the inbound voice packet from the first communication unit, the decode status indicates whether the inbound voice packet was received by the base station in a correctable form. The first communication unit also is configured to retransmit the inbound voice packet to the base station when the decode status sent by the base station to the first communication unit indicates that a last transmission of the inbound voice packet was received by the base station in an uncorrectable form. The first communication unit further is configured to limit a number of the retransmissions of the inbound voice packet to the base station to a predetermined value.

DETAILED DESCRIPTION OF THE INVENTION

Figure 1:
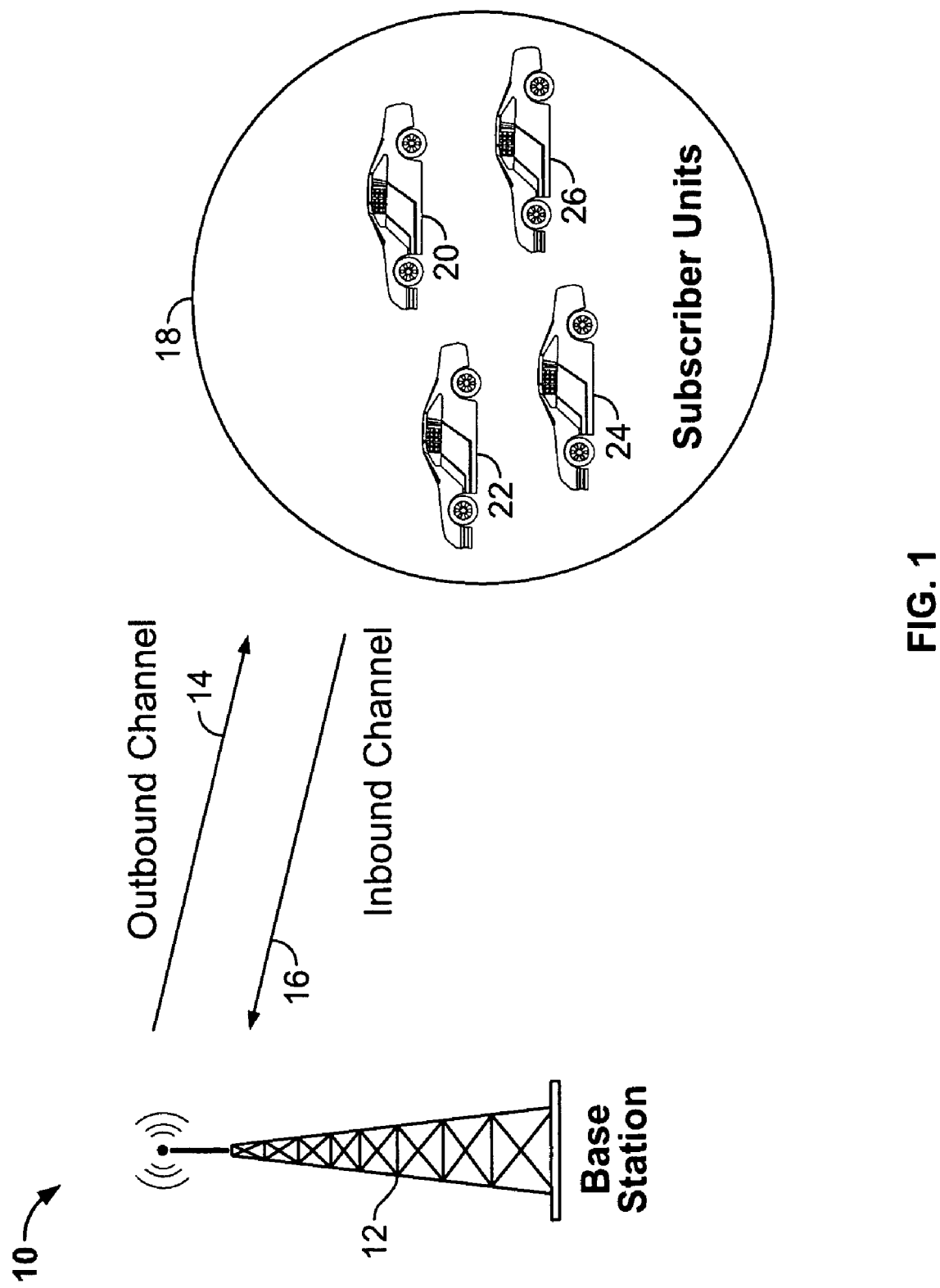
FIG. 1 is a diagram illustrating an exemplary embodiment of a wireless communication system.

FIG. 1 is a diagram illustrating an exemplary embodiment of a wireless communication system 10. Specifically, the wireless communication system 10 includes a base station 12 transmitting, for example, voice on an outbound channel 14 to a group 18 of mobile communication units 20, 22, 24, and 26 (e.g., mobile telephone units or other subscriber units). Although the communication units 20, 22, 24, and 26 are shown as mobile communication units (e.g., telephone units installed within cars), the communication units may be any type of mobile or portable unit (e.g., portable cellular telephone) or a combination thereof. An inbound channel 16 is also provided and may have a portion of its bandwidth allocated at a particular time to one of the communication units (e.g., communication unit 22) to communicate a message to base station 12. Base station 12 may then communicate the message to another communication unit (e.g., communication unit 24) on the outbound channel 14. Further, although only one base station 12 is shown in FIG. 1, wireless communications system 10 may include a plurality of base stations each servicing a plurality of communication units. In one embodiment, the communication units may be organized into voice groups, wherein a voice transmission from one member of a group is communicated by a base station directly or through a network of base stations to all other members of the group. In another embodiment, communication is provided between two communication units serviced by one or more base stations 12.

In operation, outbound channel 14 communicates, for example, voice data from base station 12 to all subscriber phone units within the coverage area of base station 12. For example, voice data received on inbound channel 16 from phone unit 22 is transmitted on outbound channel 14 to communication units 20, 24, and 26. In various embodiments, outbound channel 14 communicates voice in the form of voice packets that are received on inbound channel 16. Inbound channel 16 communicates voice data from, for example, subscriber phone units (e.g., communication units 20, 22, 24, and 26), to base station 12 in the form of inbound voice packets. Transmissions received on inbound channel 16 may then be communicated, also known as repeated, by base station 12 on outbound channel 14 for communication to other voice group members within the coverage area. Transmissions on inbound channel 16 also may be communicated to other base stations 12 for group members serviced by those base stations 12.

Figure 2:
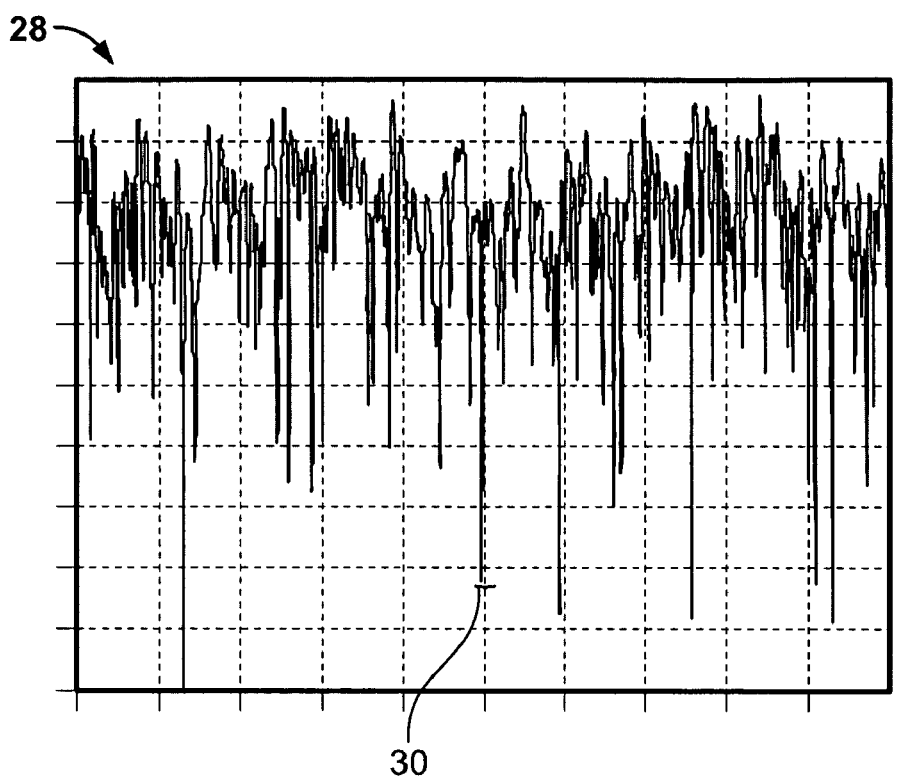
FIG. 2 is a graph showing typical multi-path fading for wireless communication from a mobile unit traveling at a fast speed.

FIG. 2 is a graph 28 showing typical multi-path fading for wireless communication from a communication unit traveling at a relatively fast speed (e.g., about 60 mph). The duration of multi-path fades for a receiving base station 12 (shown in FIG. 1) depends on the distance from the transmitting unit, and on the speed at which the transmitting unit is travelling relative to the receiving base station 12. As shown in graph 28, at faster speeds, short duration multi-path fades represented by downward vertical spikes, for example, spike 30, may result. The duration for these spikes 30 are typically about 5 msec or less. Errors in these signals having short duration multi-path fading may be corrected using Reed Solomon codes.

Figure 3:
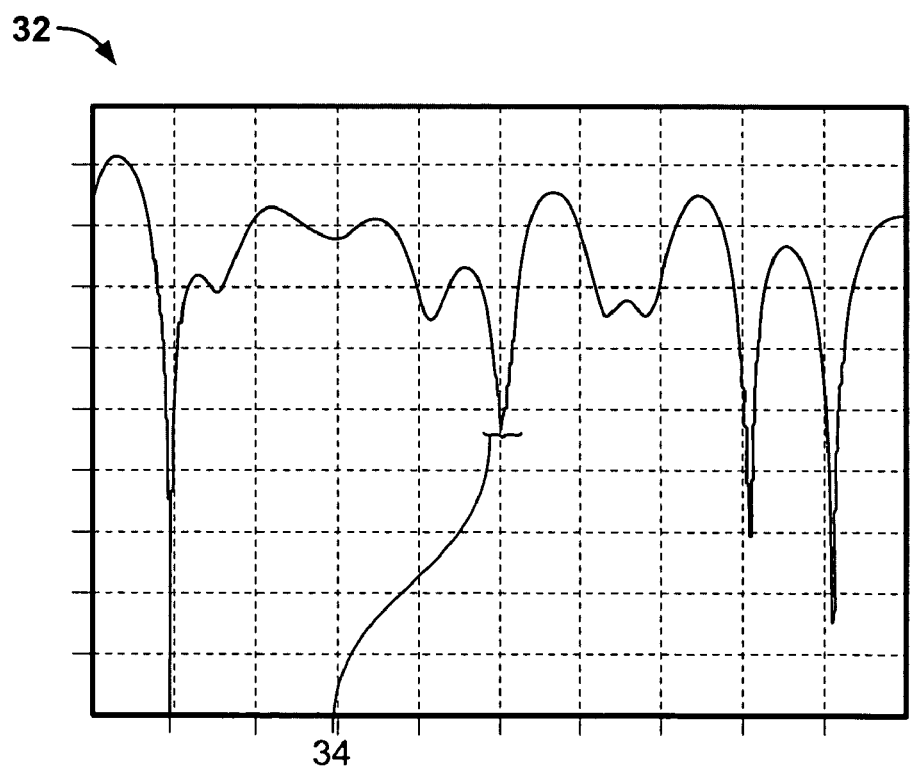
FIG. 3 is a graph showing typical multi-path fading for wireless communication from a portable unit travelling at slow speeds or at rest.

FIG. 3 is a graph 32 showing typical multi-path fading for wireless communication from a communication unit (e.g., portable or mobile phone units) traveling at relatively slow speeds (e.g., walking speeds of 5 mph or less). As shown in graph 32, at slower speeds, wider multi-path fades than those in graph 28 result, as represented, for example, by spike 34. The duration for these wider spikes 34 representing the multi-path fade duration is typically greater than 5 milliseconds (ms). Errors in these signals having longer duration multi-path fading may not satisfactorily be corrected using detection and correction codes (e.g., a Reed Solomon code). Thus, poorer voice transmission may result.

Figure 4:
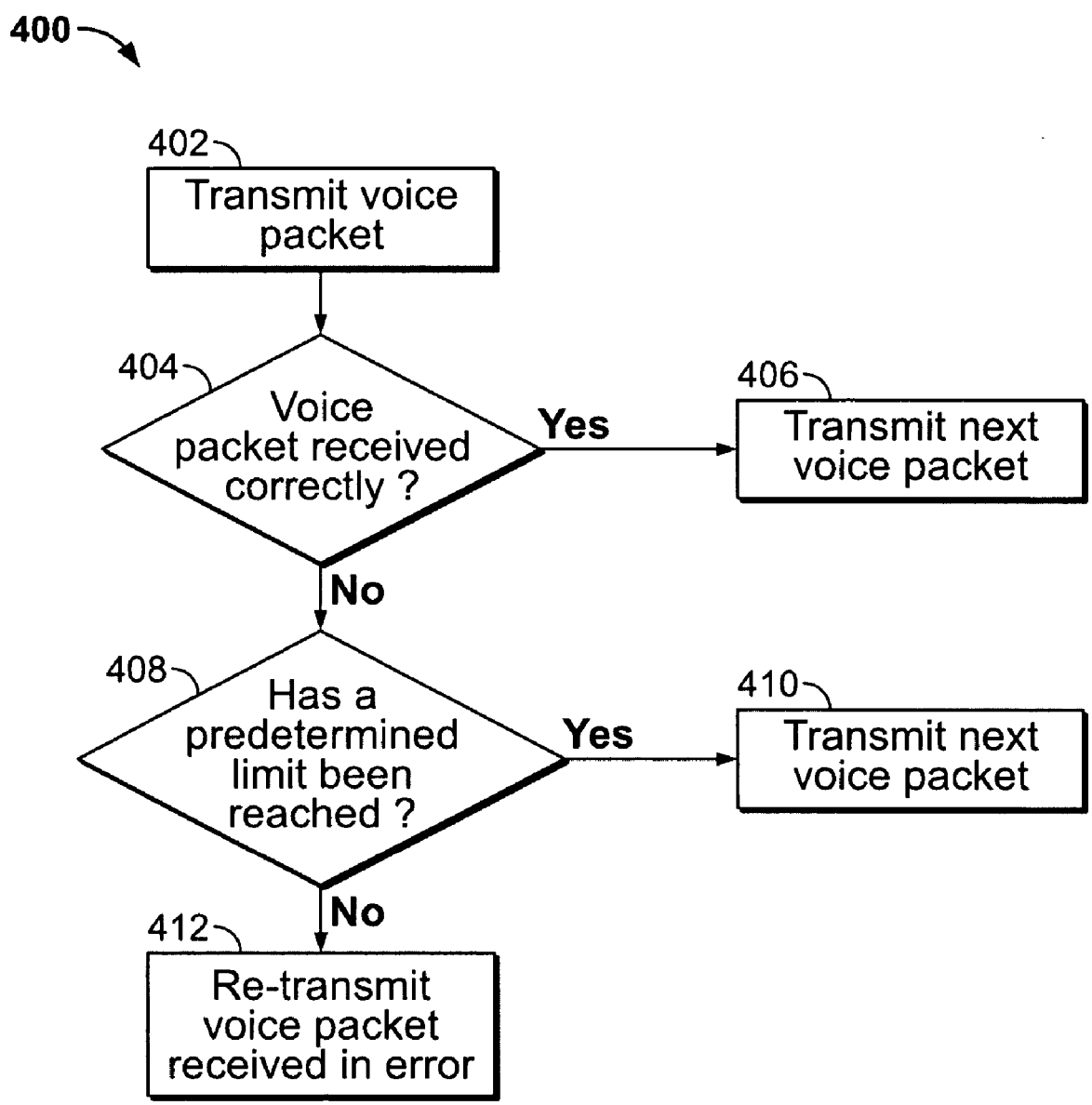
FIG. 4 is a flow chart illustrating a method for retransmission of voice packets in a wireless communication system in accordance with an embodiment of the invention.

FIG. 4 is a flow chart 400 illustrating a method for retransmission of voice signals, e.g. voice packets/blocks, in a wireless communication system in accordance with an embodiment of the invention. Specifically, at 402, a voice packet/block is transmitted. It should be noted that the voice packet may be transmitted, for example, from a base station to a communication unit or from a communication unit to a base station. The transmission may be provided in a half duplex or full duplex mode. A decision is made at 404 as to whether the packet was received in a useable form at the receiving unit (e.g. a base station) from the transmitting unit (e.g. a communication unit). The result of the decision may be returned in the protocol, for example, as a decode status within a decode status control block. If at 404 a determination is made by the original transmitting unit that the packet was received in a useable form, then a next packet is transmitted at 406 from the transmitting unit. Alternatively, if at 404 a determination is made that the packet was not received in a useable form, at 408 a determination is made by the transmitting unit as to whether a predetermined limit for a number of retransmissions has been reached. If a limit has been reached, the transmitting unit does not retransmit the packet received in error, but at 410 transmits the next packet awaiting transmission. If a limit has not been reached, the transmitting unit at 412 retransmits the packet that was received in error.

Optionally, in one embodiment, a counter for determining the limit (e.g., the number of times a retransmission may occur), and as described in more detail herein, is based on a predetermined stored value that may be based upon the application and the priority of the call for the application. As further described herein, because the transmission rate of the voice packet is faster than the generation rate of the voice packet, transmission of a voice packet completes before a next voice packet is ready for transmission. For example, in one embodiment, the transmission of a packet takes 30 milliseconds and the generation of the packet takes 90 milliseconds (e.g., a packet with 90 milliseconds of voice). The time after a packet transmission has completed and before a next voice packet is ready for transmission may be used to retransmit a voice packet received previously in error without unduly impacting voice latency.

Figure 5:
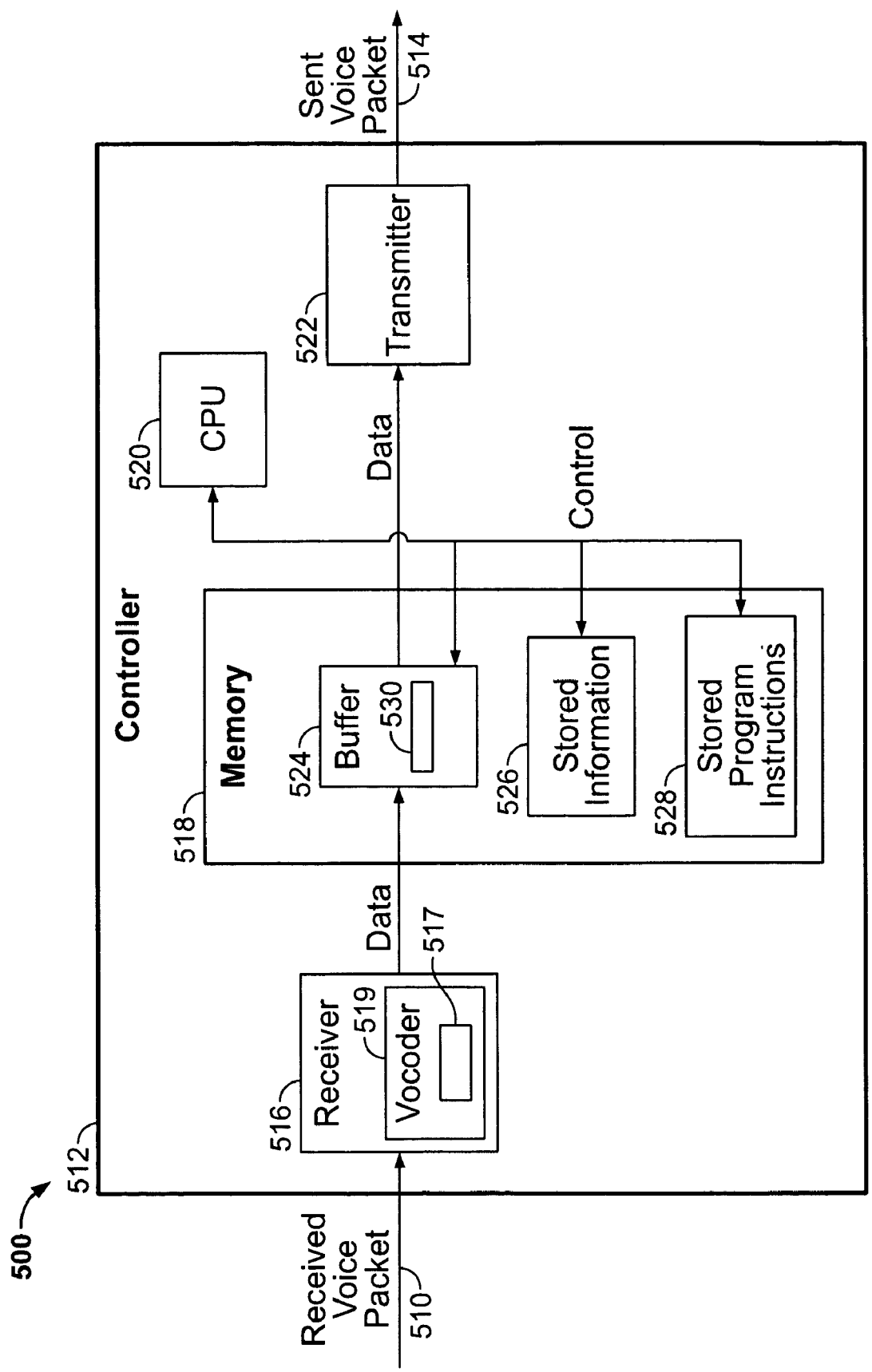
FIG. 5 is a block diagram illustrating a controller for communicating packets in a wireless communication system in accordance with an embodiment of the invention.

FIG. 5 is a block diagram 500 illustrating a controller 512 for communicating voice packets in a wireless communication system in accordance with an embodiment of the invention. The controller 512 receives a voice packet 510 at a receiver 516. The receiver 516 may buffer the received voice packet 510 in a buffer 524 of a memory 518 as a buffered voice packet 530 in one mode of operation. Alternatively, in another mode, the receiver 516 may communicate the received voice packet 510 through a compression/decompression component 517 of a voice coder/decoder (vocoder) 519. The compressed/decompressed voice result is then buffered as the voice packet 530 in the buffer 524. The buffer 524 provides storage for the received voice packets 510 until the buffered voice packet 530 has been transmitted by a transmitter 522 and received successfully as a sent voice packet 514 by a next entity (e.g., the base station 12 shown in FIG. 1). A stored information component 526 of the memory 518 provides for storage of predefined data (e.g., the predetermined stored value for the limiting value for the number of permitted retransmissions) as described in FIG. 4. A CPU 520 executes a set of stored program instructions 528 to perform the operations of the controller 512 as described in the various embodiments of the invention herein.

In one mode of operation, for example, the controller 512 receives voice spoken by a user and transmits the voice to a base station. The received voice packet 510, for example, is uncompressed voice spoken by a human user. The receiver 516, in this mode, first compresses the voice packet 510 using the compression/decompression component 517, and a compressed voice packet is buffered in the buffer 524 as the buffered voice packet 530. The buffered voice packets 530 are transmitted by the transmitter 522 as the sent voice packets 514. The sent voice packets 514 may be received, for example, by the base station 12.

Alternatively, and in another mode of operation, for example, the controller 512 receives compressed voice, such as from a base station, to be output over a speaker. The received voice packet 510 is compressed voice to be decompressed and output. The receiver 516 first decompresses the voice packet 510 using the compression/decompression component 517, and a decompressed voice packet is buffered in the buffer 524 as the buffered voice packet 530. The buffered voice packets 530 are transmitted by the transmitter 522 as sent voice packets 514 to a speaker which outputs the voice/sound.

In another alternative mode of operation, the controller 512 receives compressed voice and transmits compressed voice, for example, within a base station. The received voice packet 510 is compressed voice and the receiver 516 transfers the received voice packet 510 into the buffer 524 as the buffered voice packet 530. The buffered voice packets 530 are transmitted by the transmitter 522 as the sent voice packets 514 to another receiver 516 of another controller 512.

In one embodiment, and for example, an advanced multi-band excitation (AMBE) compression technique provides for a higher voice packet transmission rate than the voice packet generation rate. A 2400 bits/sec (bps) vocoder 519 employing AMBE to compress 90 ms of analog voice into a packet that transmits in about 30 ms creates what is known as spare bandwidth (BW). The spare BW may be used in several ways. For example, the spare BW may be used to improve voice quality by using a higher rate vocoder, (e.g., a 4800 bps vocoder) in comparison with a 2400 bps vocoder (the change in vocoder being equivalent to having a higher sampling rate of the analog voice signal). However, the improvement in quality may not be very significant due to the latest versions of low rate (e.g. 2400 bps) vocoders producing fairly high quality voice. Alternatively, the spare BW may be used to improve the error detection/correction (EDC) capability, for example, a Reed Solomon (63,33) code [RS(63,33] code may be used in contrast to an RS(63,45) code as is known. However, the greater amount of EDC capability provided by the RS(63,33) code is not enough to handle detection and correction of errors in a voice packet experiencing long multi-path fading. Thus, a greater improvement may be provided by using the spare BW to retransmit voice packets received in error by a receiving station (e.g. a base station or a communication unit) as described herein. An appropriate selection of a Reed Solomon code (e.g., an RS(63,45) code), may provide detection of errors in voice packets for voice packets experiencing long multi-path fades, although the RS(63,45) code may not be able to correct the found errors. Thus, the receiving station may signal a transmitting station (e.g. a base station or a communication unit) to retransmit the failed packet. Retransmission of voice packets received in error that are uncorrectable (e.g., failed voice packets) provides a way to correct voice packets with errors experiencing long multi-path fades.

Figure 6:
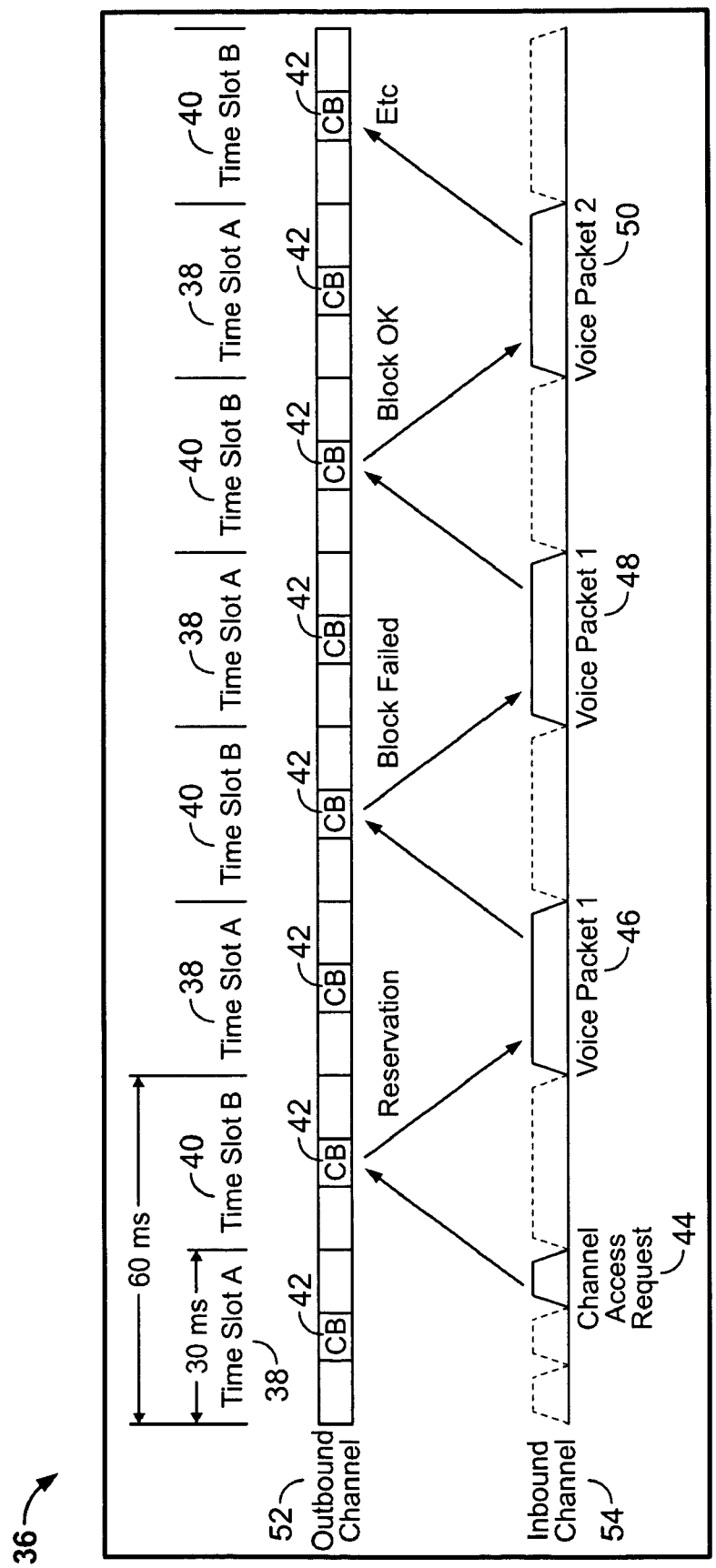
FIG. 6 is a diagram illustrating a protocol scheme in accordance with an embodiment of the invention.

FIG. 6 is a diagram illustrating an embodiment of a protocol 36 in accordance with the invention that may be used, for example, to correct for multi-path fading in connection with communication units traveling at relatively slow speeds (e.g., 5mph or less) using the controller 512. FIG. 6 shows a 2 Time Division Multiple Access (TDMA) protocol 36 wherein communication channels, for example, an outbound channel 52 and inbound channel 54, are divided into time slots (TSs). For example, in one embodiment, the communication channels are divided into time slot "A" (TS 38) and time slot "B" (TS 40). As an example, TS 38 and TS 40 together form a 60 ms interval of time, with each of TS 38 and TS 40 being 30 ms in duration. A given TS (e.g., TS 38), repeats periodically, and when allocated to a particular user or communication unit, provides the user or communication unit a period of time for use of the channel. For example, in one embodiment, TS 38 occurs about 16.6 times a second, and thus, provides about 500 ms of time for each second of use of the channel by the allocated user.

As shown in FIG. 6, the protocol 36 includes a plurality of control blocks 42 (CB 42) within each time slot of the outbound channel 52. In operation, a channel access request 44 is made on the inbound channel 54 when a communication unit requires a TS for communication to the base station 12 (shown in FIG. 1). Obtaining a TS allows, for example, a phone unit to transmit voice packets to a base station so as to not interfere or collide with the transmission of voice packets from other communication units. During transmission of voice, voice signals are digitized and transmitted as individual voice packets in voice blocks, for example, voice blocks 46, 48, and 50 as shown in FIG. 6. Two voice blocks may include the same voice packet, for example, voice blocks 46 and 48 include the same voice packet 1 being retransmitted as described herein. Thus, the voice packet in voice block 48 may be a retransmission of the voice packet in voice block 46.

Various embodiments provide a voice packet transmission rate that is faster than a voice packet generation rate (e.g., a voice frame/block/packet is transmitted at a higher rate than at which the frame/block/packet is generated). Transmitting a voice packet at a rate faster than the packet generation rate allows for retransmission of voice packets so as not to cause an unacceptable delay or voice latency.

In operation, retransmission of a voice packet (e.g., voice block 48 is a retransmission of voice packet 1 which was transmitted in voice block 46), may be provided for every two voice packets transmitted without adding to voice latency. In one embodiment, the need to retransmit a voice packet is indicated by a base station to a communication unit, for example, base station 12 to communication unit 22 (both shown in FIG. 1), by sending a decode status within a control block 42 (CB 42) that indicates a last transmission of an inbound voice packet was received by base station 12 with errors in an uncorrectable form. For example, an RS(63,45) code detected errors, but was unable to correct the detected errors and a decode status is sent indicating such the failure.

Using protocol 36, a phone unit subscriber, for example, a communication unit 22, first requests a time slot (TS) for use in communicating voice to the base station 12. For example, a user pushes a push-to-talk button on a phone unit and a channel access request 44 is transmitted on inbound channel 54 in an available timeslot (e.g., TS 38), to base station 12. Base station 12 responds to the request for a TS by including in control block (CB) 42 of TS 40 of outbound channel 52 the allocation of TS 38 for use by the requester. Through the use of allocated TS 38, the user is able to transmit voice to base station 12 (e.g., voice block 46). If voice block 46 is received corrupted at base station 12, for example, as a result of multi-path fading as described herein, base station 12 first attempts to use the RS(63,45) code to correct the detected errors in voice block 46. If voice block 46 is not correctable (e.g., communication unit travelling at a slower speed), base station 12 encodes CB 42 of TS 40 with a decode status that indicates the received voice block 46 failed to be corrected.

Upon receiving CB 42, the subscriber phone unit retransmits voice packet 1 in voice block 48 as shown in FIG. 6. It should be noted that the voice packet sequence number encoded in the voice block is unchanged as voice blocks 46 and 48 carry the same voice packet 1. It should be noted that the packet sequence number may be used by a receiving station to determine, for example, whether a duplicate inbound voice packet has been received or whether an inbound voice packet is missing in a sequence of received inbound voice packets. As described below, a predetermined number of retransmissions by the subscriber phone unit is allowed and if the number of retransmissions is exceeded, no further retransmissions are provided and the voice data is discarded. If after retransmission, base station 12 again receives voice packet 1 with uncorrectable errors, base station 12 transmits a decode status in CB 42 indicating the failure and the communication unit retransmits the voice packet if the retransmission limit has not been exceeded. Depending on the application or type of group of subscribers (e.g. a SWAT team or firefighters or a work group), the predetermined number of retransmissions is set accordingly, for example, less retransmissions allowed as the time sensitive nature of the data being transmitted increases. When voice packet 1 or a retransmission of voice packet 1 is finally received in a useable form or is correctable, or once the limit of predetermined retransmissions has been exceeded, the next voice packet (e.g., voice packet 2), is then transmitted to base station 12.

In the event that voice packets are missing in the received sequence, various methods may be used to address this condition. For example, one method for addressing missing voice packets includes delaying the start of voicing of audio by the number of voice blocks limited for retransmissions. Alternatively, audio may be voiced immediately after receiving the first voice packet, and any subsequent gaps are handled by voicing periods of silence (e.g., "mute" frames) or by repeating previous voice frames or by interpolating between voice frames.

The example shown in FIG. 6 is for a half-duplex mode wherein the communication unit may either transmit or receive, but not both simultaneously. Thus, retransmissions are shown only on the inbound channel. However, the protocol 36 may be implemented in connection with a full-duplex mode as described below. Thus, in operation, the base station 12 receives a sequence of voice blocks from a communication unit, which may include multiple transmissions of a certain voice packet or a transmission sequence of packets with missing packets. After error detection and correction is attempted, voice packets that cannot be corrected are discarded. Dummy "filler" packets as described herein are also discarded. The base station 12 operates to form a correct sequence of voice packets that is used to reconstruct the voice messages spoken at the transmitting communication unit.

Further, although FIG. 6 shows voice packet retransmission only in the inbound channel direction (e.g., towards a base station 12), retransmission of voice blocks by the base station 12 toward a communication unit also may be provided. For example, when a communication unit operates in full duplex mode, full duplex allows for simultaneous transmission and reception by the individual unit. Thus, a communication unit transmits and receives simultaneously with another phone unit via the base station(s), as compared to half duplex transmission by a communication unit wherein broadcasting of the received voice by a base station to a group of other phone units is provided. In one embodiment, with communication units operating in full duplex mode, a communication phone unit transmits via a base station(s) to only one other subscriber phone unit. The one other receiving phone unit provides a decode status in a response to the base station regarding correct reception of the voice packet as described above. For example, a decode status is included in a control block, such as CB 42, in a return response to the base station regarding the correct reception of the voice packet. In this manner, the methods described above may be used in a full-duplex mode for retransmission between two individual communication units via a base station.

Figure 7:
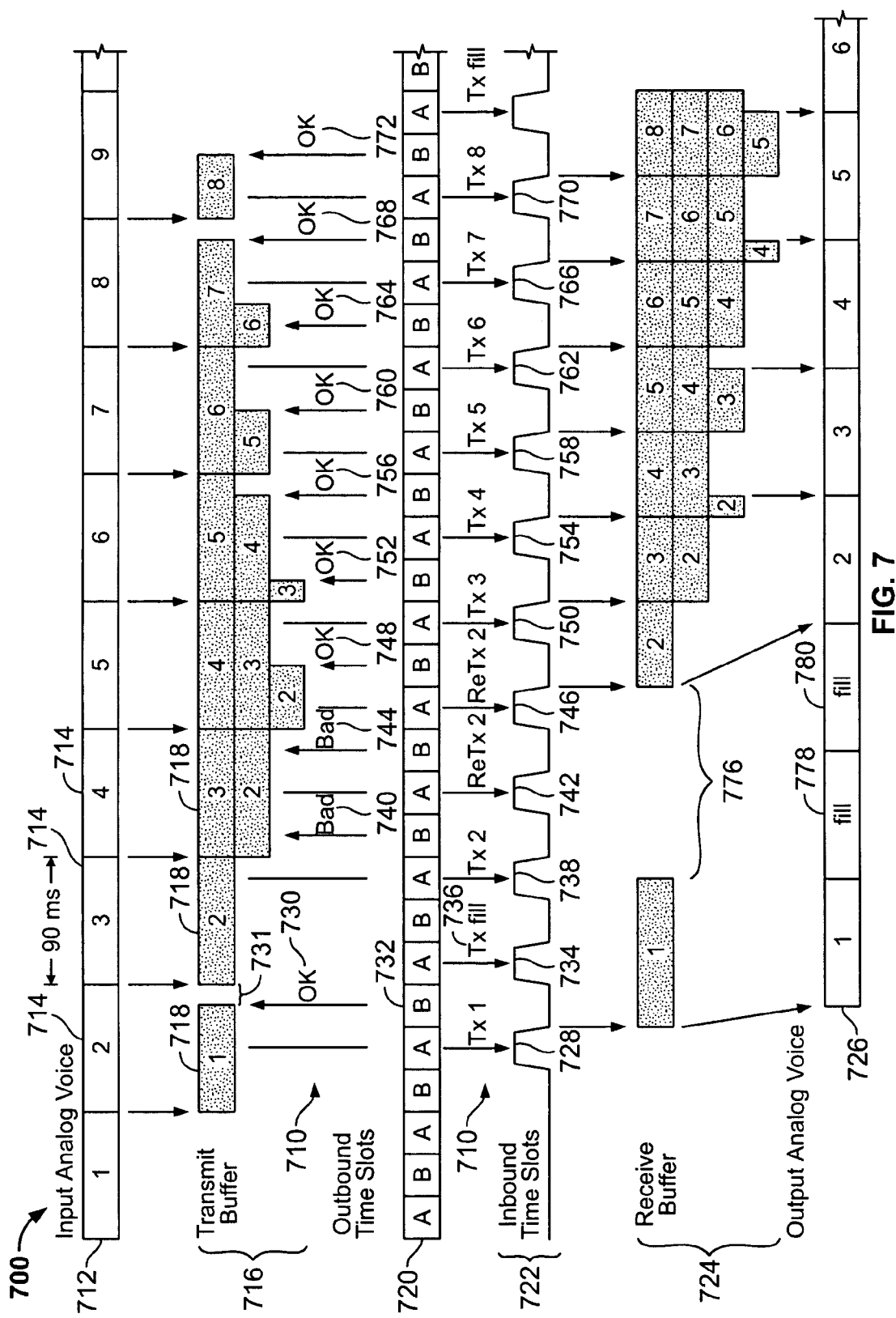
FIG. 7 is a timing diagram illustrating an example of timing and use of an embodiment of the protocol scheme of the invention.

FIG. 7 is a timing diagram 700 illustrating an example of timing for use with protocol 36 by controller 512 in accordance with an embodiment of the invention. FIG. 7 shows the relative timing of a transmissions 710 in an exemplary communication. A top line 712 of the diagram shows the generation of analog voice, which is divided into 90 ms segments 714, and compressed using AMBE, then formatted into voice frames 718 (also known as packets or blocks). The voice frames 718 are loaded into a transmit buffer 716 (e.g., buffer 524 shown in FIG. 5) for transmission over a radio channel. The process of generating the voice frames 718 may be asynchronous to the radio channel time slotting, however, as shown in FIG. 7, a radio channel outbound time slots (TSs) 720 and an inbound time slots (TSs) 722 are synchronized. However, the outbound TSs 720 and inbound TSs 722 may also be asynchronous. An output analog voice 726 is illustrated also as being asynchronous to the radio channel time slotting with a fixed delay.

The first 90 ms of analog voice is encoded and formatted into a voice frame 1 and loaded into the transmit buffer 716. The voice frame 1 is transmitted during an inbound time slot A (TS 728), and an OK status 730 is received during an outbound time slot B (TS 732) indicating that the voice frame 1 was properly received. Once the OK status 730 is received, the voice frame 1 is then cleared from the transmit buffer 716. When the voice frame 1 is received by a destination device, voice frame 1 is loaded by the destination device into a receive buffer 724 and converted into 90 ms of analog voice that is provided to the user. For a short period of time, the transmit buffer 716 is empty as indicated by reference numeral 731. No voice frame is available at the start of the next inbound time TS 734, and thus a fill frame 736 is transmitted instead of a voice frame. The fill frame 736 is ignored by the destination device.

A first transmission of voice frame 2 during inbound TS 738 is damaged or corrupted on the radio channel (bad status 740), and is retransmitted during inbound TS 742. The first retransmission is also unsuccessful (bad status 744), but the second retransmission during inbound TS 746 is successful (OK status 748). From this point forward, the channel is clear and voice frames 3, 4, 5, 6, 7, and 8 are successfully transmitted (OK statuses 752, 756, 760, 764, 768, and 772) on the first attempt during inbound TS 750, 754, 758, 762, 766, and 770, correspondingly.

It should be noted that the two retransmissions during inbound TS 742 and 746 cause the transmit buffer 716 to fill. The transmit buffer 716 is then reduced due to packets being transmitted from the transmit buffer 716 faster than packets are loaded. The receive buffer 724 has an under-run condition indicated by gap 771, causing two fill frames 778 and 780 to be generated. The receive buffer 724 later fills when the channel clears. In a steady state condition, the transmit buffer 716 is empty and the receive buffer 724 is at the maximum receive buffer size.

One approach for handling received frames is to have the receiving device wait to fill its receive buffer before presenting voice to the user. This approach avoids the problem of voice degradation due to fill frames, but incurs the maximum voice latency. If the channel is clean, this latency might be unnecessary. In an alternate approach, the receiving device begins presenting voice to the user immediately, and inserts fill frames as needed. The fill frames are interpreted by the user as normal channel impairments, and the total number of fill frames is limited by the maximum receive buffer size. The alternate approach does not incur voice latencies unless actually required by voice frame retransmissions.

Figure 8:
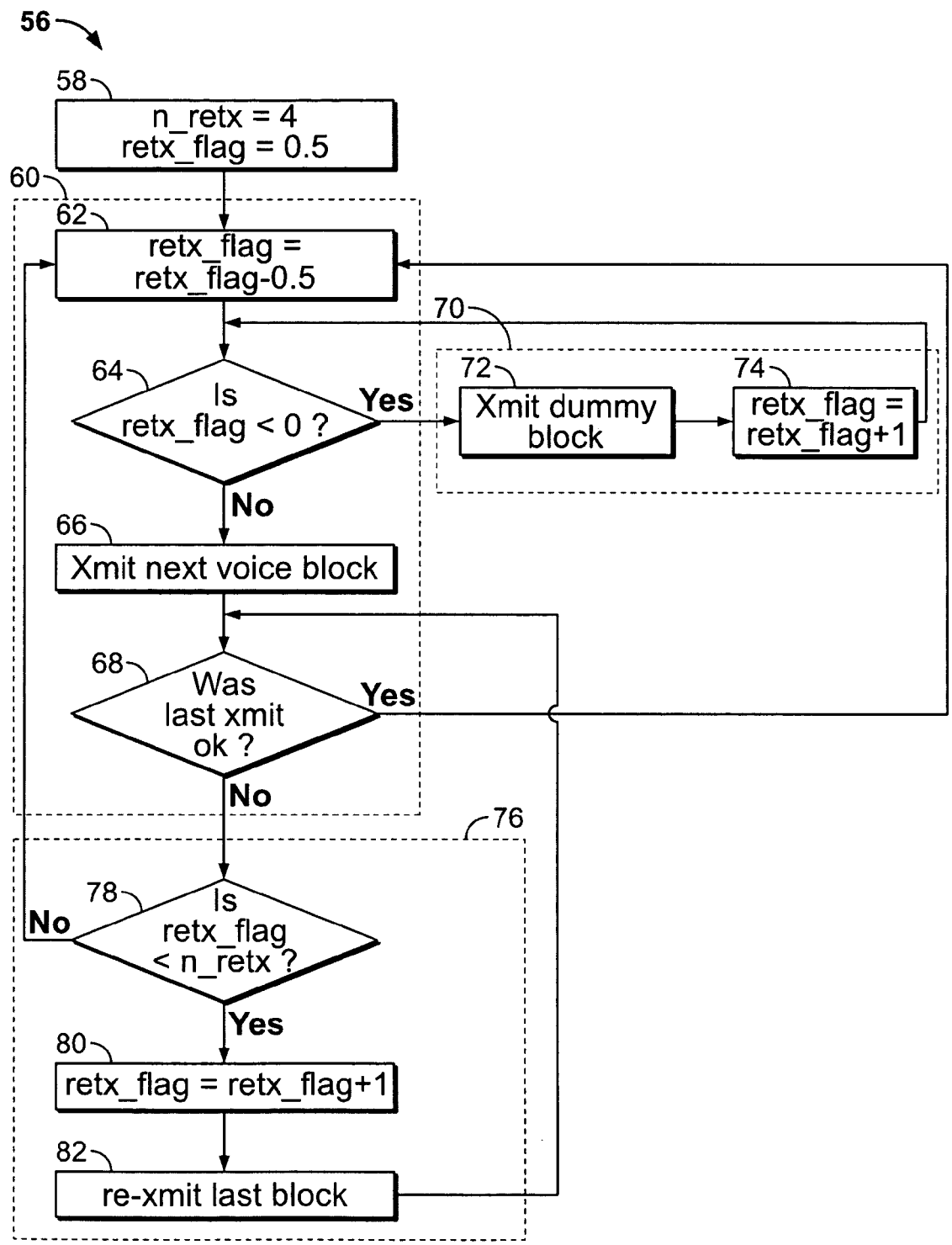
FIG. 8 is a flow chart illustrating a more specific method for retransmission of voice packets in a wireless communication system in accordance with an embodiment of the invention.

FIG. 8 is a flow chart 56 illustrating a more specific method for retransmission of voice packets in a wireless communication system using controller 512 in accordance with an embodiment of the invention. Specifically, at 58 two flags are initialized, for example, n_retx is set to a predetermined value and retx_flag is set to a predetermined value. N_retx defines a limit value for the number of retransmissions allowed and retx_flag defines a counter value that counts the number of retransmissions performed. At 58, retx_flag is initially set to a predetermined value of 0.5 and n_retx is set to a predetermined value of 4. When performing a voice packet transmission, retx_flag is decremented by 0.5, and when performing a retransmission, retx_flag is incremented by 1.

At 62, the retx_flag is decremented in preparation for checking the flag at 64. At 64, retx_flag is checked for being less than zero. In one exemplary embodiment, checking retx_flag includes accessing the memory 518 (shown in FIG. 5) to determine whether the value stored in the memory 518 is less than zero, for example, as part of the controller logic. If less than zero (e.g., no next voice packet is ready for transmission), at 72 a dummy voice packet is transmitted followed by incrementing retx_flag by one at 74. Alternatively, if retx_flag is equal to or greater than zero (e.g., a next voice packet is buffered and ready for transmission), then the next voice packet is transmitted at 66. At 68, a determination is made whether the previously transmitted voice block was transmitted successfully. If transmitted successfully, then the retx_flag is decremented at 62. If not transmitted successfully, a determination is made at 78 as to whether the count of retransmissions (retx_flag) has reached the limit for allowed retransmissions (n_retx). If the count of retransmissions has not reached the limit (retx_flag<n_retx), then the count of retransmissions is incremented by one at 80 and at 82 the previously transmitted block is retransmitted. Alternatively, if the count of retransmissions has reached the limit (e.g., retx_flag equal to or greater than n_retx), then the retx_flag is decremented at 62.

In one embodiment, the n_retx flag is a constant stored in the memory 518 with a value based on a specific application/subscriber group. For example, n_retx may be set to a value of 1 for a SWAT team group of subscribers, or alternatively may be set to a value of 4 for a normal work group of subscribers. In FIG. 7, n_retx is set to a value of 4 designating a maximum of 4 retransmissions allowed for a voice packet.

Essentially, n_retx defines the maximum amount of voice latency permitted for a communication unit. As described in one embodiment herein, because the first retransmission occurs 60 ms after the first transmission of a voice packet, one retransmission adds about 60 ms of latency to the voice packet. Four retransmissions adds about 60×4=240 ms of latency to the voice packet. This is a limiting amount for communication units of at least some subscriber groups as voice latency becomes noticeable to humans for a latency of about 250 ms or greater. In the case of highly critical, but less time sensitive voice information, for example, when a firefighter is attempting to send a voice message to the rest of his or her group, the integrity of the message is more important than the latency issues (small voice delays), and an n_retx value of 4 or greater may be acceptable. Alternatively, for a member of a police SWAT team in an emergency situation, wherein synchronization of movement and immediacy of communications is more important, setting the n_retx value to a value of 1 or even 0 may be provided for the group of SWAT team subscribers and based on the priority of the situation.

In yet another embodiment, each group of subscribers may have assigned a priority level that may change based on, for example, the changing situation. When the priority level of a group changes, the base station communicates this change in priority to the communication units for the members of the group, the communication units then using an appropriate value for n_retx associated with the priority level. Specifically, a predetermined number is assigned to n_retx by a communication unit, with the predetermined number determined by parameters currently associated with the communication unit. At least some of these parameters, include, for example, the type of group of which the phone unit is a member (e.g., police SWAT, firefighters, or road repair workers) and the current priority for the group.

The variable retx_flag is used to count the number of retransmissions. Since retransmission of a voice packet allows another voice packet to accumulate in the buffer 524, the retx_flag also is used to count the number of voice blocks accumulated in the buffer 524. If, for example, the transmission of voice packets occurs 50% faster than the generation of voice packets at the source, then, if for every retransmission (add 1 to retx_flag), there are two successful transmissions (subtract 0.5 twice from retx_flag), retx flag does not change. The pattern of transmitting and receiving two voice packets successfully followed by transmission of a dummy block exemplifies a normal operation wherein voice is transmitted 50% faster than the rate at which a source is generating the voice (e.g., with the use of AMBE compression).

Thus, a main transmission loop 60, represented by steps 62, 64, 66, and 68, provides for transmission of a next voice packet. A dummy/fill block transmission loop 70, represented by steps 70 and 74, provides for the transmission of a dummy block when there are no voice packets ready for transmission in the buffer 524. A retransmission loop 76, represented by steps 78, 80, and 82, provides for retransmission of a voice packet when a last transmitted voice packet failed to be received in a useable form.

In one embodiment, a wait loop may be implemented at 68 to wait for receipt of control block 42 (CB 42) shown in FIG. 6. Upon receiving CB 42, a determination is made using CB 42 at 68 as to whether the last transmission/retransmission was successfully received.

At 78, if retx_flag is not less than n_retx, the maximum number of voice packets allowed for collection in the buffer 524 has accumulated, a next voice block is transmitted as compared to a retransmission of the last failed voice packet. The method of flow chart 56 provides control of long multipath fades with retransmissions, while minimizing retransmissions to minimize an unacceptable voice latency for the specific application/subscriber group.

In one embodiment, a communication unit of the group of mobile and portable phone units for the wireless communications system includes a microprocessor-based system (e.g., the controller 512 described in FIG. 5). The method of flow chart 56 of FIG. 8 then may be implemented as a set of software instructions (e.g., the stored program instructions 528 of the memory 518). In yet another embodiment, one or more base stations of the wireless communications system includes a microprocessor-based system. The microprocessor-based system of the base station implements the method of flow chart 56 as a set of software instructions stored in a memory of the microprocessor-based system for execution by the microprocessor.

As used herein, the term "computer" may include any processor-based or microprocessor-based system including systems using CPUs, microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method for controlling wireless communications, said method comprising:
transmitting a voice packet from a base station to a communication unit at a rate faster than a generation rate of the voice packet, wherein the difference in rate between the transmission and generation of the voice packet creates spare bandwidth;
determining whether the transmitted voice packet is successfully received; and
retransmitting the voice packet using the created spare bandwidth if the voice packet was not successfully received, a number of retransmissions limited by a predetermined value based upon (i) monitoring a difference between a number of outbound voice packets generated at the base station and a number of outbound voice packets successfully transmitted by the base station, the difference representing a number of the outbound voice packets generated that have accumulated in a communication buffer of the base station, and (ii) limiting the number of the outbound voice packets accumulated in the communication buffer to the predetermined value.

2. A method in accordance with claim 1 wherein the determining comprises determining whether the transmitted voice packet is received in a correctable form.

3. A method in accordance with claim 2 further comprising using a Reed Solomon code in combination with control blocks in the voice packets to determine whether the voice packet is received in the correctable form and whether to retransmit the voice packet.

4. A method in accordance with claim 1 wherein the predetermined value is based on at least one of a type of transmission, a type of communication unit, a priority level and a group type for a plurality of communication units.

5. A method in accordance with claim 1 wherein the transmission of voice packets is at a rate fifty percent faster than the generation rate.

6. A method for controlling wireless communications, said method comprising:
transmitting from a first communication unit to a base station an inbound voice packet at a rate greater than a generation rate of the inbound voice packet, wherein the difference in rate between the transmission and generation of the inbound voice packet creates spare bandwidth;
receiving by the first communication unit from the base station a decode status in response to receiving the inbound voice packet at the base station from a last transmission, the decode status indicating whether the inbound voice packet of the last transmission was received by the base station in a correctable form;
retransmitting from the first communication unit to the base station the inbound voice packet using the created spare bandwidth when the decode status indicates to the first communication unit that the inbound voice packet of the last transmission by the first communication unit was received by the base station in an uncorrectable form; and
limiting a number of the retransmissions from the first communication unit to the base station to a predetermined value by (i) monitoring a difference between a number of inbound voice packets generated at the first communication unit and a number of inbound voice packets successfully transmitted by the first communication unit, the difference representing a number of the inbound voice packets generated that have accumulated in a communication buffer of the first communication unit, and (ii) limiting the number of the inbound voice packets accumulated in the communication buffer to the predetermined value.

7. A method in accordance with claim 6 wherein the inbound voice packet includes error detection and correction information for use by the base station to determine whether the inbound voice packet was received in a correctable form.

8. A method in accordance with claim 7 wherein the error detection and correction information is a Reed Solomon code.

9. A method in accordance with claim 6 wherein the inbound voice packet includes a voice packet sequence number for use by the base station in at least one of (i) determining a duplicate inbound voice packet to discard and (ii) determining whether an inbound voice packet is missing in a sequence of received inbound voice packets.

10. A method in accordance with claim 6 wherein the predetermined value is based on parameters associated with the first communication unit including parameters at least one of a type of a group of communication units in which the first communication unit has membership and a current priority for the group.

11. A method in accordance with claim 6 further comprising transmitting on an outbound channel to at least one other communication unit of a group of communication units the received inbound voice packet.

12. A method in accordance with claim 6 wherein the base station transmits on an outbound channel for reception and processing by a second communication unit the inbound voice packet that was received from the first communication unit, the first communication unit and the second communication unit transmitting and receiving in full duplex mode, and wherein:
transmitting the received inbound voice packet on an outbound channel is at a rate greater than the generation rate of the inbound voice packet by the first communication unit;
receiving from the second communication unit by the base station a decode status in response to a last transmission of the received inbound voice packet to the second communication unit from the base station, the decode status indicating whether the last transmission of the received inbound voice packet to the second communication unit was received by the second communication unit in a correctable form;
retransmitting from the base station to the second communication unit the received inbound voice packet when the decode status received from the second communication unit by the base station indicates that the last transmission of the received inbound voice packet to the second communication unit was received by the second communication unit in an uncorrectable form; and
limiting a number of the retransmissions of the received inbound voice packet from the base station to the second communication unit to the predetermined value.

13. A method in accordance with claim 12 wherein the received inbound voice packet that is transmitted to the second communication unit includes error detection and correction information for use by the second communication unit to determine whether the received inbound voice packet was received by the second communication unit in a correctable form.

14. A method in accordance with claim 12 wherein the received inbound voice packet that is transmitted to the second communication unit includes a voice packet sequence number for use by the second communication unit in determining a duplicate received inbound voice packet to discard and in determining whether a received inbound voice packet is missing in a sequence of received inbound voice packets.

15. A method in accordance with claim 12 wherein the predetermined value is based on parameters associated with the first and second communication units, including a current priority.

16. A wireless communications system comprising:
a base station and a plurality of communication units for communicating with the base station; and
a first communication unit of the plurality of communication units configured to transmit to the base station an inbound voice packet at a rate greater than a generation rate of the inbound voice packet, wherein the difference in rate between the transmission and generation of the inbound voice packet creates spare bandwidth, the base station configured to send a decode status to the first communication unit in response to receiving the inbound voice packet from the first communication unit, the decode status indicating whether the inbound voice packet was received by the base station in a correctable form, the first communication unit configured to retransmit the inbound voice packet to the base station using the created spare bandwidth when the decode status sent by the base station to the first communication unit indicates that a last transmission of the inbound voice packet was received by the base station in an uncorrectable form, and the first communication unit further configured to limit a number of the retransmissions of the inbound voice packet to the base station to a predetermined value;
the first communication unit being configured to monitor a difference between a number of inbound voice packets generated at the first communication unit and a number of inbound voice packets successfully transmitted by the first communication unit, the difference representing a number of inbound voice packets accumulated in a buffer of the first communication unit, and to limit the number of inbound voice packets accumulated in the buffer to the predetermined value.

17. A wireless communications system in accordance with claim 16 wherein the first communication unit and a second communication unit are configured to transmit and receive in full duplex mode, and wherein:
transmitting on an outbound channel of the received inbound voice packet is at a rate greater than the generation rate of the inbound voice packet by the first communication unit;
a decode status is transmitted from the second communication unit to the base station in response to a last transmission by the base station of the inbound voice packet, wherein the decode status indicating whether the last transmission by the base station of the inbound voice packet was received in a correctable form by the second communication unit;
retransmitting from the base station to the second communication unit the inbound voice packet when the decode status received from the second communication unit by the base station indicates to the base station that the inbound voice packet of the last transmission by the base station was received by the second communication unit in an uncorrectable form; and
limiting a number of the retransmissions of the inbound voice packet from the base station to the second communication unit to the predetermined value.

* * * * *